(12) United States Patent
Herbach et al.

(10) Patent No.: US 8,712,981 B2
(45) Date of Patent: Apr. 29, 2014

(54) MECHANISM FOR VISIBLE USERS AND GROUPS

(75) Inventors: Jonathan D. Herbach, Mountain View, CA (US); Betty Y. Koon, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/421,180

(22) Filed: Mar. 15, 2012

(65) Prior Publication Data

US 2014/0032599 A1    Jan. 30, 2014

Related U.S. Application Data

(63) Continuation of application No. 11/867,496, filed on Oct. 4, 2007, now Pat. No. 8,150,820.

(51) Int. Cl.
*G06F 17/30* (2006.01)

(52) U.S. Cl.
USPC .......................................................... 707/694

(58) Field of Classification Search
USPC ........................ 707/694, 791, 781; 709/200
See application file for complete search history.

(56) References Cited

U.S. PATENT DOCUMENTS

| | | | |
|---|---|---|---|
| 5,544,322 A * | 8/1996 | Cheng et al. ................... | 709/229 |
| 5,796,951 A | 8/1998 | Hamner et al. | |
| 5,864,683 A | 1/1999 | Boebert et al. | |
| 5,941,947 A | 8/1999 | Brown et al. | |
| 6,141,686 A | 10/2000 | Jackowski et al. | |
| 6,178,505 B1 | 1/2001 | Schneider et al. | |
| 6,237,036 B1 * | 5/2001 | Ueno et al. ..................... | 709/225 |
| 6,253,251 B1 | 6/2001 | Benantar et al. | |
| 6,408,336 B1 * | 6/2002 | Schneider et al. ............ | 709/229 |
| 6,502,131 B1 | 12/2002 | Vaid et al. | |
| 6,678,733 B1 * | 1/2004 | Brown et al. .................. | 709/229 |
| 6,721,318 B1 * | 4/2004 | Cai et al. ........................ | 370/390 |
| 6,754,702 B1 * | 6/2004 | Kennelly et al. ............... | 709/223 |
| 6,785,728 B1 | 8/2004 | Schneider et al. | |
| 6,917,975 B2 * | 7/2005 | Griffin et al. .................. | 709/225 |
| 6,941,355 B1 * | 9/2005 | Donaghey et al. ............ | 709/220 |
| 6,985,955 B2 * | 1/2006 | Gullotta et al. ................ | 709/229 |
| 7,085,834 B2 * | 8/2006 | Delany et al. ................. | 709/225 |
| 7,272,625 B1 * | 9/2007 | Hannel et al. ................. | 709/200 |
| 7,363,339 B2 * | 4/2008 | Delany et al. ................. | 709/202 |
| 7,475,151 B2 * | 1/2009 | Delany et al. ................. | 709/229 |
| 7,484,237 B2 * | 1/2009 | Joly et al. ........................... | 726/1 |
| 7,580,919 B1 * | 8/2009 | Hannel et al. ........................ | 1/1 |
| 7,624,424 B2 * | 11/2009 | Morita et al. ...................... | 726/1 |

(Continued)

OTHER PUBLICATIONS

U.S. Appl. No. 11/867,496, Appeal Brief filed Sep. 14, 2011, 13 pgs.
U.S. Appl. No. 11/867,496, Examiner Interview filed Mar. 9, 2010, 1 pg.

(Continued)

*Primary Examiner* — Sheree Brown
(74) *Attorney, Agent, or Firm* — Schwegman Lundberg & Woessner, P.A.

(57) ABSTRACT

Various embodiments described herein provide systems, methods, software, and data structures to allow or prevent viewing of users and groups of users by other users and groups of users. Some such embodiments include retrieving a listing of members from a member database, defining a first subset of one or more members selected from the retrieved member listing, and designating the first member subset as visible to a second subset of one or more members when a member of the second member subset retrieves a member listing.

17 Claims, 8 Drawing Sheets

(56) References Cited

U.S. PATENT DOCUMENTS

| | | | |
|---|---|---|---|
| 7,630,986 B1* | 12/2009 | Herz et al. | 1/1 |
| 7,673,047 B2* | 3/2010 | Delany et al. | 709/225 |
| 7,716,240 B2* | 5/2010 | Lim | 707/781 |
| 7,821,926 B2* | 10/2010 | Hannel et al. | 370/229 |
| 8,150,816 B2* | 4/2012 | Lim | 707/694 |
| 8,150,820 B1* | 4/2012 | Herbach et al. | 707/705 |
| 8,156,566 B2* | 4/2012 | Lim | 726/30 |
| 2002/0023132 A1* | 2/2002 | Tornabene et al. | 709/205 |
| 2002/0129135 A1* | 9/2002 | Delany et al. | 709/223 |
| 2002/0138572 A1* | 9/2002 | Delany et al. | 709/204 |
| 2002/0156879 A1* | 10/2002 | Delany et al. | 709/223 |
| 2003/0105734 A1* | 6/2003 | Hitchen et al. | 707/1 |
| 2004/0024762 A1* | 2/2004 | Agarwal et al. | 707/9 |
| 2004/0049675 A1* | 3/2004 | Micali et al. | 713/158 |
| 2004/0199402 A1 | 10/2004 | Walker et al. | |
| 2005/0010820 A1 | 1/2005 | Jacobson | |
| 2005/0138411 A1* | 6/2005 | Griffin et al. | 713/200 |
| 2005/0193093 A1 | 9/2005 | Mathew et al. | |
| 2005/0262132 A1 | 11/2005 | Morita et al. | |
| 2006/0089938 A1* | 4/2006 | Leonard et al. | 707/100 |
| 2006/0149968 A1 | 7/2006 | Edery et al. | |
| 2006/0195575 A1 | 8/2006 | Delany et al. | |
| 2006/0212574 A1* | 9/2006 | Maes | 709/226 |
| 2007/0156659 A1* | 7/2007 | Lim | 707/3 |
| 2007/0156670 A1* | 7/2007 | Lim | 707/4 |
| 2007/0156694 A1* | 7/2007 | Lim | 707/9 |
| 2007/0156695 A1* | 7/2007 | Lim | 707/9 |
| 2007/0156696 A1* | 7/2007 | Lim | 707/9 |
| 2007/0156727 A1* | 7/2007 | Lim | 707/100 |
| 2007/0157287 A1* | 7/2007 | Lim | 726/1 |
| 2007/0157288 A1* | 7/2007 | Lim | 726/1 |
| 2007/0169168 A1* | 7/2007 | Lim | 726/1 |
| 2007/0179987 A1* | 8/2007 | Lim | 707/200 |
| 2009/0150968 A1 | 6/2009 | Ozzie et al. | |

OTHER PUBLICATIONS

U.S. Appl. No. 11/867,496, Examiner Interview Summary mailed Mar. 5, 2010, 3 pgs.

U.S. Appl. No. 11/867,496, Examiner Interview Summary mailed Jul. 30, 2010, 3 pgs.

U.S. Appl. No. 11/867,496, Final Office Action mailed Mar. 16, 2011, 11 pgs.

U.S. Appl. No. 11/867,496, Final Office Action mailed Jun. 7, 2010, 13 pgs.

U.S. Appl. No. 11/867,496, Non-Final Office Action mailed Sep. 24, 2010, 3 pgs.

U.S. Appl. No. 11/867,496, Non-Final Office Action mailed Dec. 2, 2009, 13 pgs.

U.S. Appl. No. 11/867,496, Notice of Allowance mailed Dec. 1, 2011, 14 pgs.

U.S. Appl. No. 11/867,496, Response filed Mar. 1, 2010 to Non Final Office Action mailed Dec. 2, 2009, 13 pgs.

U.S. Appl. No. 11/867,496, Response filed Sep. 1, 2010 to Final Office Action mailed Jun. 7, 2010, 8 pgs.

U.S. Appl. No. 11/867,496, Response filed Dec. 23, 2010 to Non Final Office Action mailed Sep. 24, 2010, 8 pgs.

Edwards, W. Keith, "Policies and Roles in Collaborative Applications", CSCW '96 Proceedings of teh 1996 ACM Conference on Computer Supported Cooperative Work, (1996), pp. 11-20.

Hirawa, S., et al., "Info-Plaza: A Social Information Filtering System for the World-Wide Web", 1996 International Conference on Parallel and Distributed Systems, 1996. Proceedings, (Jun. 1996), pp. 10-15.

Reiter, M., et al., "Integrating Security in a Group Oriented Distributed System", 1992 IEEE Computer Society Symposium on Research in Security and Privacy, 1992. Proceedings, (1992), pp. 18-32.

Shen, Honghai, et al., "Access Control for Collaborative Environments", CSCW '92 Proceedings of the 1992 ACM Conference on Computer-Supported Cooperative Work, (Nov. 1992), pp. 51-58.

\* cited by examiner

MECHANISM FOR VISIBLE USERS AND GROUPS

RELATED APPLICATION

This application related to and is a continuation of U.S. application Ser. No. 11/867,496, filed Oct. 4, 2007, to which priority is claimed and the entirety of which is incorporated herein.

BACKGROUND INFORMATION

Digital rights management generally includes a digital license attached, or otherwise associated, to an item of content, such as a document, audio/visual media file, or other content type. A digital license may be assigned to a content item with an association to one or more users or groups that are authorized to utilize or perform one or more other functions with the content item. When assigning a user or group to the content item, an author or administrator of the content item often grants permission to users or groups of users by selecting users or groups from a list.

DETAILED DESCRIPTION

Various embodiments described herein provide mechanisms by which users and groups defined within a system may be viewed only by certain individuals, such as by certain content authors or administrators, when granting permissions for use of an electronic content item. In some such embodiments, an administrator defines a policy including policy details indicative of permissions for the use of an item of content, such as a page description language document. Such a policy, once defined, may then be associated with a content item. However, the administrator also assigns individuals and groups to the policy. When assigning individuals and groups to the policy, the administrator may select desired individuals and groups from a listing. The listing in such embodiments may include only a select number of users and groups for which the administrator is allowed to view and assign rights. As a result, the administrator, content author, or other user is prevented from granting content item permissions other than to the select number of individuals and groups. These and other embodiments are described in detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
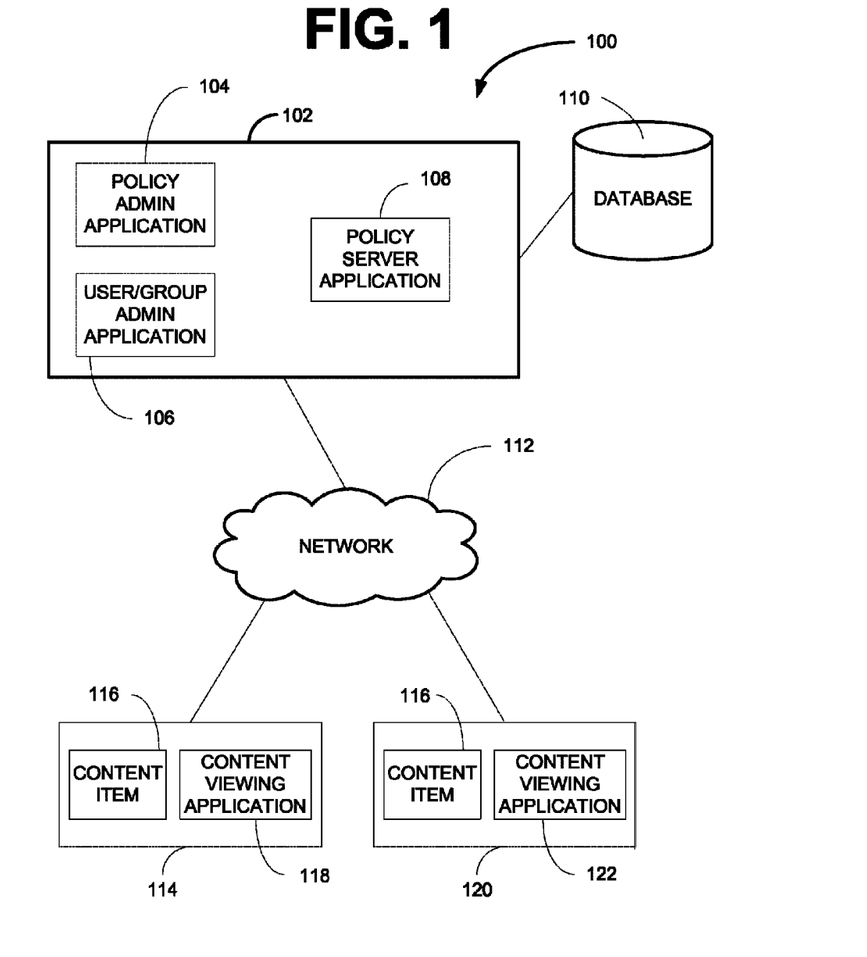
FIG. 1 is a block diagram of a system according to an example embodiment.

FIG. 1 is a block diagram of a system according 100 to an example embodiment. The system 100 includes a server 102, a database 110, and a network 112 coupling the server 102 to clients 114 and 120. The server includes a policy administration application 104, a user/group administration application, and a policy server application 108. The clients 114 and 120 each include a content item 116 and content viewing applications 118 and 122.

The policy administration application 104 is operable on the server 102 to allow policy administrators to define content permission policies that may be stored in the database 110. Content permission policies typically identify actions that may be performed with regard to an item of content, such as a page description language document, a word processing document, an audio file, a video file, or other item of content. Content permission files typically include assignments of one or both of users and user groups that the policy is applicable to. Such a policy, when defined, may be associated with or referenced within an item of content, such as content item 116 on the clients 114 and 120. As used herein, a user may be a human user or a logical user, such as a process.

The user/group administration application 106 may be operable to allow a user having certain administrative privileges to designate users and groups as visible to other users having privileges to define content item access policies using the policy administration application 104. In such embodiments, a user with a highest level of privilege may select a user or group of users and explicitly make other users and groups of users visible to the select user or group of users within the policy administration application 104 when assigning a content item access policy to users and groups of users. The content item access policies and the data identifying visible users may be stored in the database 110. Although the policy administration application 104 and user/group administrative application 106 are illustrated as separate applications, they may be included within a single application. In some embodiments, these applications 104 and 106 may be client/server type applications. In other embodiments, these applications 104 and 106 may be delivered over the Internet.

The content item 116, in some embodiments, includes a reference to a content item access policy stored in the database. In such embodiments, the client 114 and 116 content viewing applications 118 and 122, when opening the content item 116, extract the content item access policy reference from the content item 116 and utilize a service of the policy server application 108 on the server to retrieve the referenced content item access policy. The content viewing applications 118 and 122, when calling the service of the policy server application 108, send the content item access policy reference and data identifying a user of the respective content viewing application 118 and 120 over the network 112. The network 112 may be the Internet, a local area network, a wide area network, or other network type.

In some embodiments, the policy server application 108, upon receipt of a service request including the content item policy server reference and the data identifying the user, queries policy data stored in the database 110 to determine if the user is assigned to the policy and retrieve the permissions the policy. If the user is not assigned to the policy, the policy server 108 may sends a message back to the content viewing application calling the service, which when received by the content viewing application 118, 122 prevents the user from performing any actions with regard to the content item 116. If the user is assigned to the policy, a message may be sent back over the network 112 to the calling content viewing application 118, 122 including a representation of actions the respective user is allowed to perform with regard to the content item 116. Thus, a user of the client 114 may be allowed to perform different actions with regard to the content item 116 than a user of the client 120.

Figure 2:
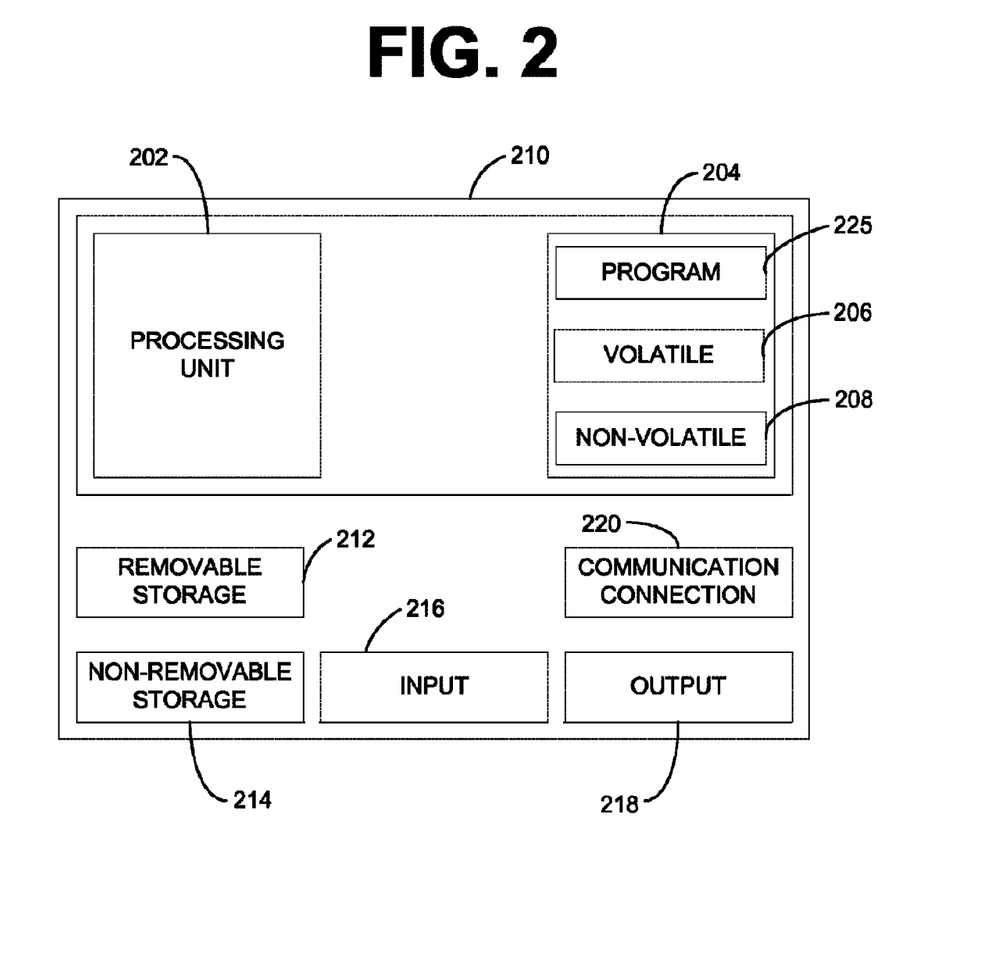
FIG. 2 is a block diagram of a computing device according to an example embodiment.

FIG. 2 is a block diagram of a computing device according to an example embodiment. In one embodiment, multiple such computer systems are utilized in a distributed network to implement multiple components in a transaction-based environment. For example, multiple computing devices may be utilized to implement one or more of the policy administration policy application 104, the user/group administration application 106, the policy server application 108, and the clients 114 and 120 as illustrated and described with regard to FIG. 1. An object-oriented architecture may be used to implement such functions and communicate between the multiple systems and components. One example computing device in the form of a computer 210 may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using the communication connection 220 to connect to one or more remote computers, such as database servers, clients, and other servers. The remote computer may include a personal computer (PC), server, router, network PC, a peer device or other common network node, or the like. The communication connection may include a Local Area Network ("LAN"), a Wide Area Network ("WAN"), the Internet, a virtual private network ("VPN"), or other networks.

Computer-readable instructions stored on a computer-readable medium are executable by the processing unit 202 of the computer 210. The computer-readable medium of a particular computer 210 implemented in a networked environment maybe include one or more programs 225. The programs may include one or more of a policy administration application, a user/group administration application, a policy server application, a content viewing application, and other applications, modules, processes, and the like depending on the particular embodiment. A hard drive, CD-ROM, and RAM are some examples of articles including a computer-readable medium.

Figure 3:
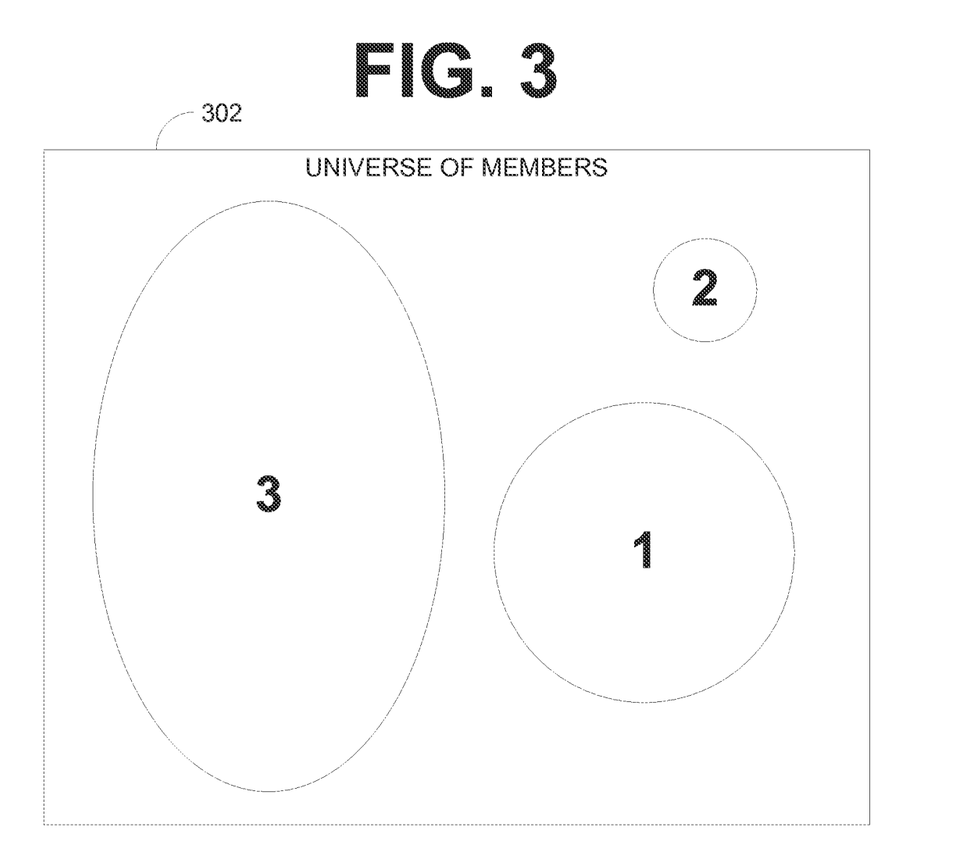
FIG. 3 is an illustration of visible member subsets visible to other members according to an example embodiment.
Figure 4A:
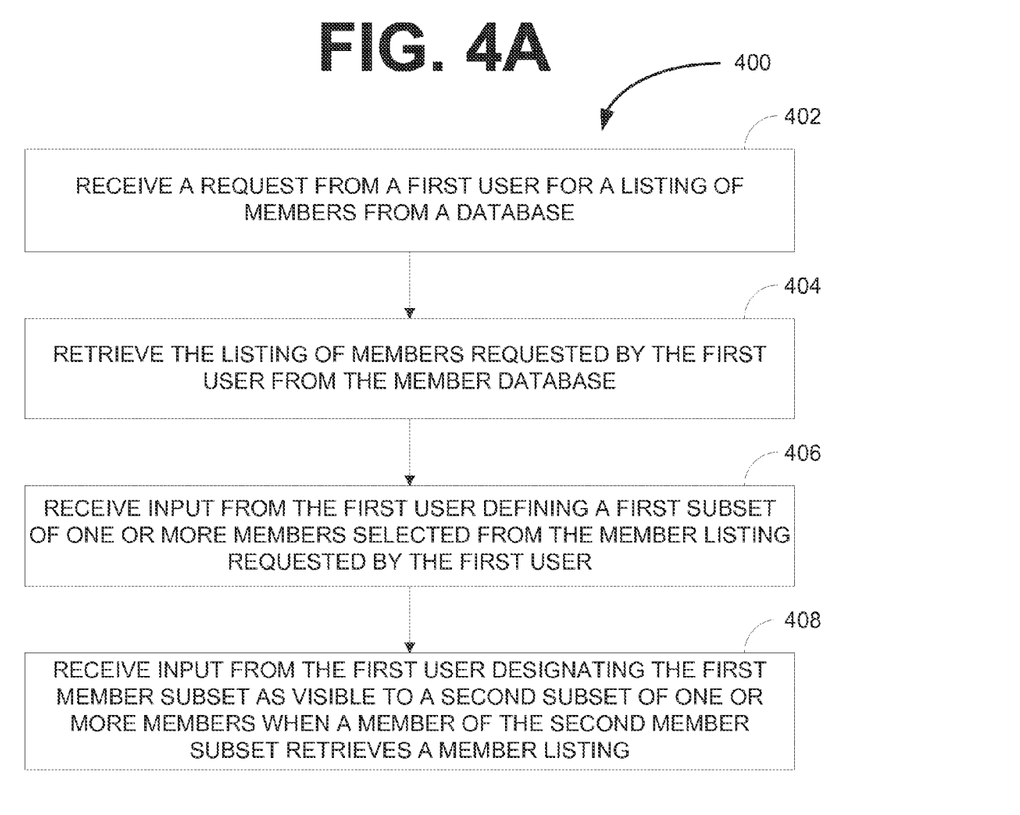
FIG. 4A is a block flow diagram of a method according to an example embodiment.
Figure 4B:
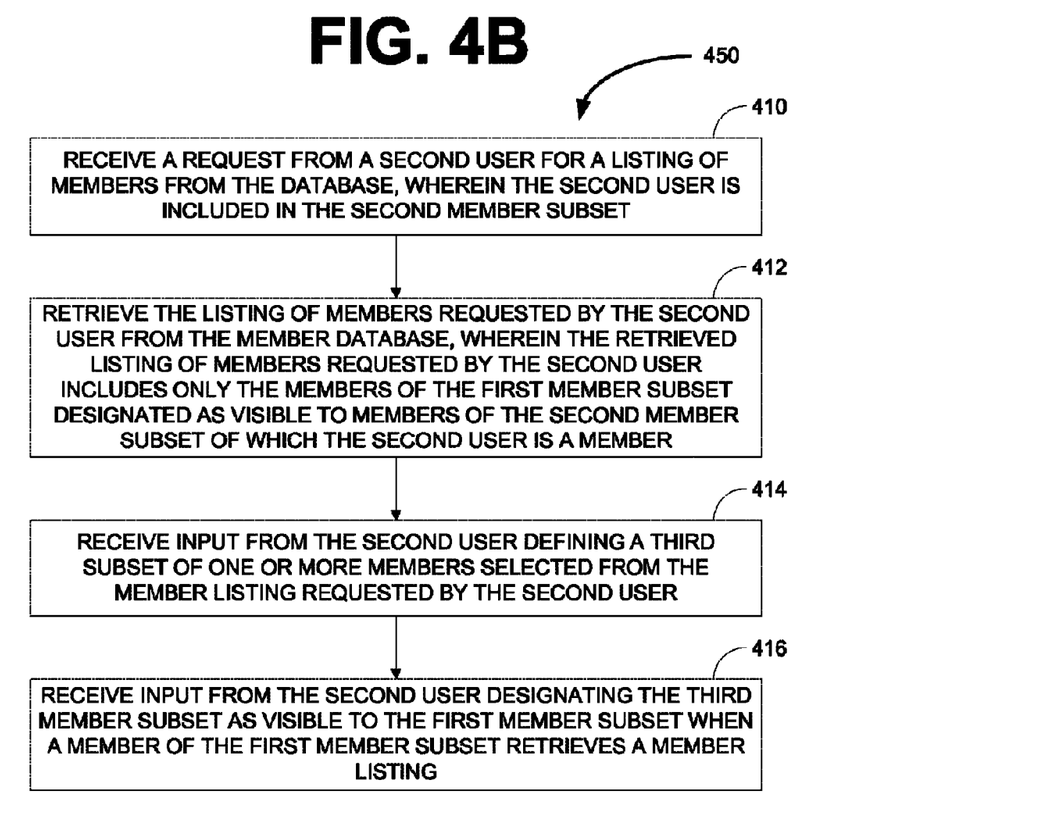
FIG. 4B is a block flow diagram of a method according to an example embodiment.

FIG. 3 is an illustration of visible member subsets visible to other members according to an example embodiment. FIG. 4A is a block flow diagram of a method 400 according to an example embodiment. FIG. 4B is a block flow diagram of a method 450 according to an example embodiment. The method 400 of FIG. 4A and the method 450 of FIG. 4B will be described with reference to the illustration of FIG. 3.

The method 400 of FIG. 4A is a method of defining a subset of users and user groups that are visible to another subset of users and groups. In some embodiments, visible users and groups are users and groups of users that are available to a policy administrator to assign to a content item access policy. By only allowing a policy administrator to assign a policy visible users, control is provided over who may be allowed access to content items. For example, if a policy administrator is authorized to administer policies applicable to accounts payable content items in an organization, that administrator may be allowed, when selecting users and groups of a content item access policy, to assign a policy to users and groups of an accounts payable group within the accounting department of the organization. This control prevents the policy administrator from inadvertently or maliciously granting access to sensitive accounts payable documents and other content items of the organization. In some embodiments, the method 400 may be performed by the user/group administration application 106 as illustrated and described with regard to FIG. 1.

Returning to FIG. 4A, in some embodiments, the method 400 includes receiving a request from a first user for a listing of members from a database 402 and retrieving the listing of members requested by the first user from the member database 404. The method 400 may further include receiving input from the first user defining a first subset of one or more members selected from the member listing requested by the first user 406. The method 400 also includes receiving input from the first user designating the first member subset as visible to a second subset of one or more members when a member of the second member subset retrieves a member listing 408

Referring now to FIG. 3, the universe of members 302 may include data representations of all users and groups in an organization, of a hosted service or other system. In some embodiments, the data representations may be data entries of users and groups within a Lightweight Directory Access Protocol ("LDAP") server. The first user in the method 400 may be an administrator having a highest level of privileges and thus can view all users and groups when retrieving the listing of members from the member database 404. The administrator then provides input to define the first subset of the one or more members selected from the member listing 406. This first subset is illustrated as the circle 1 within the universe of members 302. Note that the second member subset is already defined within the universe of members 302, represented in FIG. 3 as circle 2. The administrator may then provide the input designating the first subset members, circle 1, as visible to second subset members, circle 2, when a second subset member retrieves a member listing 408.

Referring now to FIG. 4B, the method 450 assumes that the first and second member subsets have already been defined. The method 450, in some embodiments, includes receiving a request from a second user for a listing of members from the database, wherein the second user is included in the second member subset 410. The method 450 also includes retrieving the listing of members requested by the second user from the member database, wherein the retrieved listing of members requested by the second user includes only the members of the first member subset designated as visible to members of the second member subset of which the second user is a member 412. In some embodiments, the method 450 further includes receiving input from the second user defining a third subset of one or more members selected from the member listing requested by the second user 414 and receiving input from the second user designating the third member subset as visible to the first member subset when a member of the first member subset retrieves a member listing 416.

Referring back to FIG. 3, the second user in the method 450 is a member of second subset, circle 2. The second user submits a request for a listing of members from the database. The second user, being a member of the second subset, is only allowed to view member of the first subset, circle 1, as described above with regard to the method 400. Thus, the listing of members retrieved from the member database will include only members of first subset, circle 1.

In some embodiments, the second user may provide input defining a third member subset, represented in the universe of members 302 as circle 3. The input defining the third member subset, circle 3, may include selection of one or more members and/or groups represented in the universe of members. The second user may provide further input designating the third member subset, circle 3, as visible to members of the first member subset, circle 1, when a member of the first member subset, circle 1, retrieves a member listing.

As a result of the methods 400 and 450 of FIGS. 4A and 4B, described above with reference to FIG. 3, an administrator may define member subsets and associate them in a hierarchical manner where a parent member subset is only able to view members of a child member subset. Such member subsets, once defined, may be used in various applications, such as a content item policy assignment application. Another application that may utilize embodiments of the member subsets is an address book application where addresses of members are viewable only to certain other members. Many other uses of such viewable member subsets are possible and contemplated herein.

Figure 5:
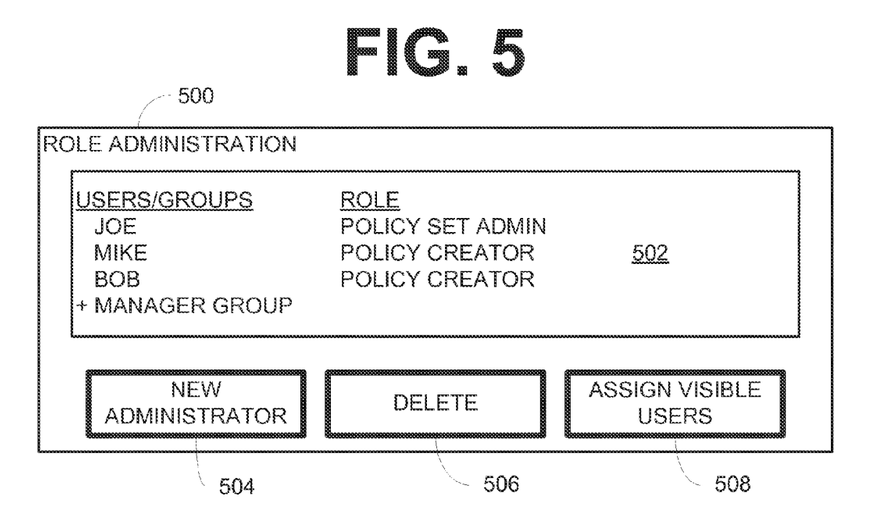
FIG. 5 is a user interface diagram according to an example embodiment.

FIG. 5 is a user interface 500 diagram according to an example embodiment. The user interface 500 may be used in some embodiments to assign a role to a user or group of users. Such a role may grant permissions to a user or group of users to define content item access policies, define visible user groups, and other permissions. In some embodiments, the user interface 500 includes a user/group and role assignment control 502 that lists visible users of an administrator having assigned roles and a role to which each listed user is assigned.

The user interface also includes a new administrator control button 504, a delete control button 506, and an assign visible users control button 508. The delete control button 506, when clicked, causes a selected row in the user/group and role assignment control 502 to be deleted. The new administrator control button 504 causes a search user window, such as the search users user interface 600 of FIG. 6, described below, to be opened. Users and groups may be searched in such a window and selected for inclusion in listing of the user/group and role assignment control 502. Once added, a role may be assigned. The assign visible users control button 508, when selected, causes a window to be displayed, such as the visible users and groups user interface 800 of FIG. 8, described below, that allows modification of users visible to a selected user or group listed in the user/group and role assignment control 502.

Figure 6:
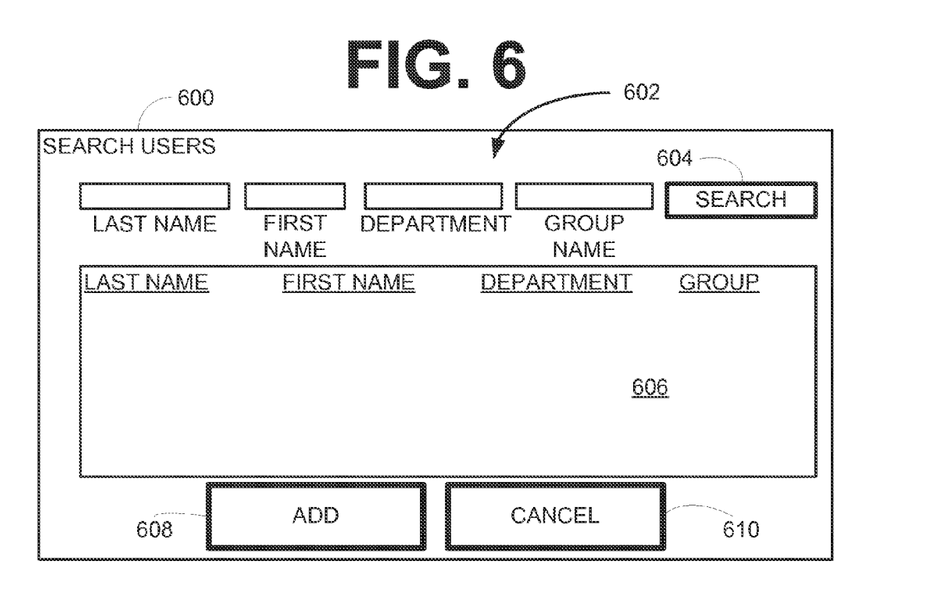
FIG. 6 is a user interface diagram according to an example embodiment.

FIG. 6 is a user interface 600 diagram according to an example embodiment. The user interface 600, in some embodiments, is operable to search for users and groups declared as visible to a user as described above. The user interface includes elements 602 that may be used to enter search criteria and a search control button 604 to submit a user and group query to a database of users and groups. The user interface 600 also typically includes a data viewing portion 606 where a query result set is displayed when received from the database in response to a submitted user and group search query.

Users and groups may be selected within the data viewing portion 606. An add control button 608 may then be clicked to cause the selected users and groups to be communicated back to a user interface from which the user interface 600 is accessed, such as the role administration user interface 500 of FIG. 5, a policy creator user interface 700 as illustrated and described with regard to FIG. 7, or other user interface. A cancel control button 610 may also be included within the user interface 600 to return to a user interface from which the user interface 600 is accessed without adding a user or group.

Figure 7:
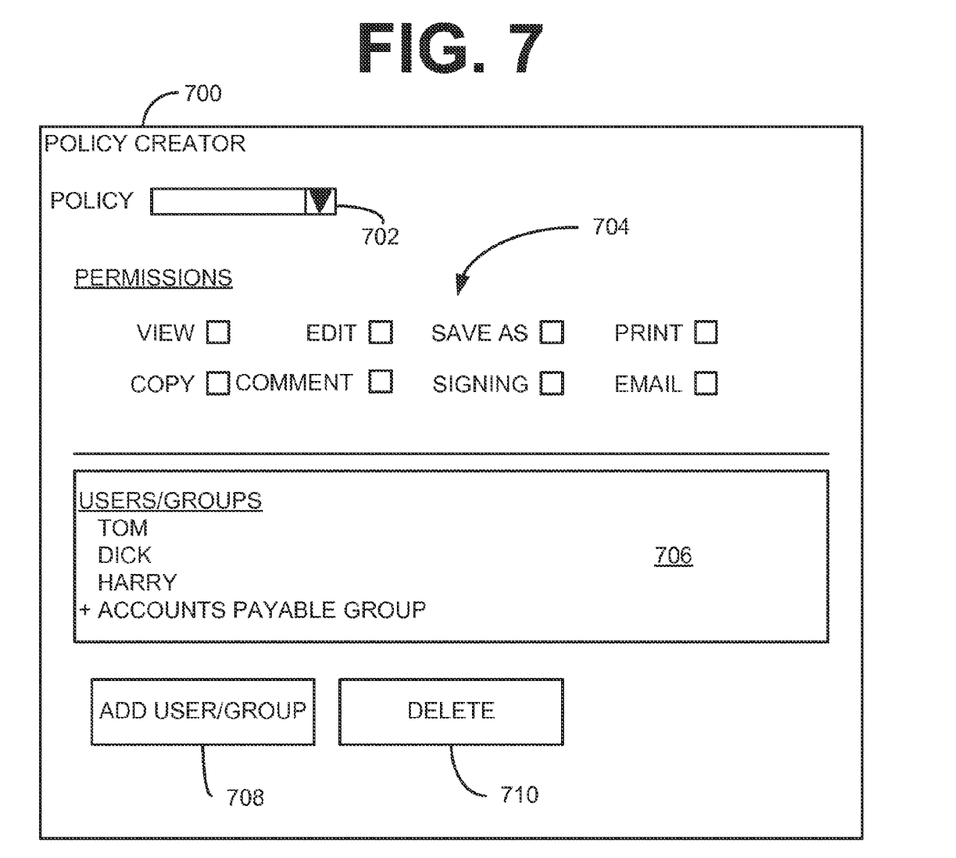
FIG. 7 is a user interface diagram according to an example embodiment.

FIG. 7 is a user interface diagram according to an example embodiment. The user interface 700, in some embodiments, is operable to receive and store input defining policies, such as content item access policies that may be associated with content items. The user interface 700 includes a policy selection drop down list box 702 that displays a selectable listing of policies that may be administered by a user of the user the user interface 700. The policy selection drop down list box 702 may include an option to create a new policy.

The user interface 700 further includes a listing of a set of permissions 704 that may be enabled by selecting a checkbox next to an identifier of each of one or more permissions. The listing of the set of permissions 704 typically includes a set of actions that may be enabled or disabled within a content viewing application, such as ADOBE® ACROBAT® when a content item is a Portable Document Format ("PDF").

The user interface 700 may also include a listing of assigned users and groups 706 of a policy selected in the policy selection drop down list box 702. The users and groups may be added using an add user/group control button 708. The users and groups in the listing of assigned users and groups 706 may also be removed from a policy through selection of a delete control button 710.

Figure 8:
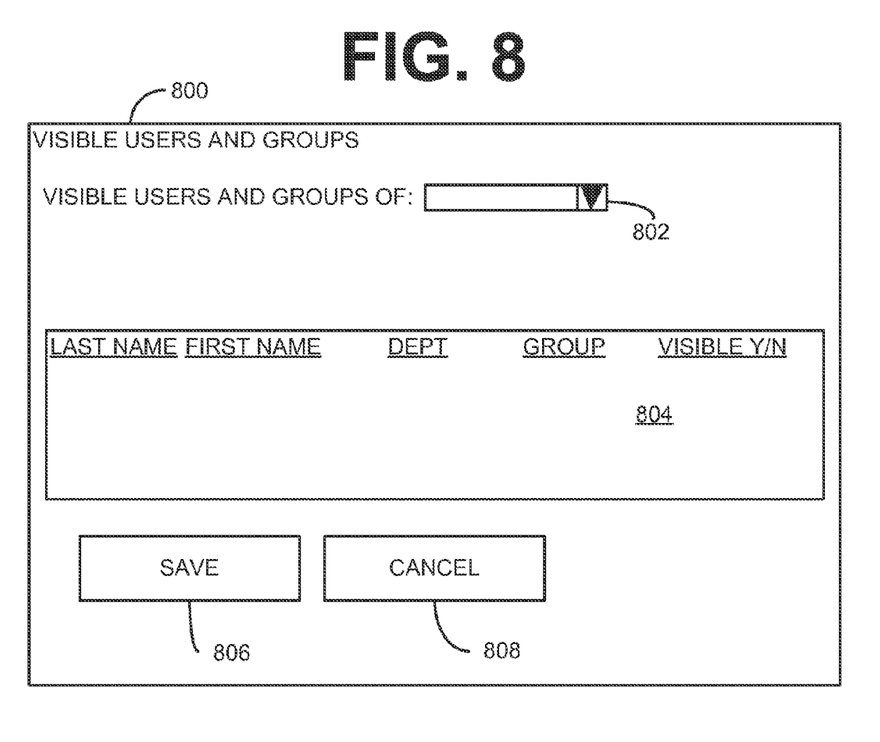
FIG. 8 is a user interface diagram according to an example embodiment.

FIG. 8 is a user interface 800 diagram according to an example embodiment. The user interface 800 is operable to display a listing of users and groups of a user 804 and to receive input designating users and groups as visible to other users and groups. The listing of users and groups of a user 804 maybe viewed in one or more ways. For example, a drop down list box 802 may be selected to specify how or what users and groups to display. For example, if a user is a member of one or more groups, the drop down list box 802 may be used to select specific groups. This may be used by an administrator with a highest user viewing permission level to select a first group of users and make one or more users from a global listing of users visible or not visible to members of the first group. In some embodiments, users may be designated as visible or not visible through manipulation of a Boolean variable, such as through a check box, of each of the users and groups listed in the listing of users and groups of a user 804. Changes may be saved using a save control button 806 or discarded using the cancel control button 808. Following selection of either the save control button 808 or the cancel control button 808, control is returned to a user interface from which the user interface 800 is accessed, such as the user interface 500 of FIG. 5.

The user interfaces, and the control and other elements therein, illustrated in FIG. 5, FIG. 6, FIG. 7, and FIG. 8 are user interfaces according to some example embodiments. However, other user interfaces and controls may be utilized in other embodiments without departing from nature and intent of the present disclosure. Thus, the illustrated user interfaces, controls, and computer applications thereof are not intended to limit the type, number, or functionality of user interfaces, controls, and computer applications that may be utilized to implement other embodiments.

Some system embodiments, which may include the user interfaces of FIG. 5, FIG. 6, FIG. 7, and FIG. 8, include a database. The database may include user records representative of system users, group records defining groups, group assignment records associating users to a groups, and visible user/group records identifying users and groups viewable by users and groups. Some such embodiments also include a visible user/group module operable. The visible user/group module is typically operable to receive, from a requestor, a request for a listing of users and groups viewable by a user, retrieve a listing of users and groups viewable by the user from the database, and return the retrieved listing to the requestor. In some embodiments, the visible user/group module may be further operable to receive the request for and present the viewable user and group listing in a user interface, receive input in the user interface to modify visible user/group records, and store the received input to the modified visible user/group records.8.

The database in some such systems may also include policy records defining content access policies assignable to items of electronic content and user/group policy records associating a policy record to a user or group. These embodiments may also include a user/group policy assignment module. The user/group policy assignment module is typically operable to receive input in a policy user interface to modify policy records and receive input in the policy user interface to modify user/group policy records. The user/group policy assignment module may also be operable to request and receive the viewable user and group listing from the visible user/group module. The input received in the policy user interface to modify user/group policy records may include input indicating an association of a policy record to a user or group record. A content access policy may identify one or more permitted or restricted actions that may be performed with regard to an item of electronic content.

In some further embodiments, the system may also include a content item policy fulfillment module. The content item policy fulfillment module is typically operable to receive a policy request from an application attempting to operate using a content item. Such a policy request may include identity data of a user of the application and data identifying a policy assigned to the content item. The content fulfillment module then determines if the user of the application is associated with the identified policy, and if the user is associated with the policy, retrieves a policy record as a function of the data identifying the policy and sending the policy record to the requesting application.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
at least one processor; and
at least one memory device to store a content item policy fulfillment module executable by the at least one processor of the system to:
receive, via a network interface device from a requesting client content viewing application, a policy request including user identity data and data identifying a policy assigned to a content item;
determine whether a user represented by the user identity data is associated with the identified policy as either a user or as a member of a defined group, the determining including performing a query against a database storing:
user records representative of system users;
group records defining groups;
group assignment records associating users to groups;
policy records defining content access policies assignable to items of electronic content, wherein a content access policy identifies one or more permitted and restricted user actions with regard to an item of electronic content when a user accesses the item of electronic content associated with the content access policy; and
user/group policy records associating a policy record to a user or group record; and
when the user is associated with the policy, retrieve a policy record as a function of the data identifying the policy, retrieve data representative of users and groups assigned to the retrieved policy record as a function of the data identifying the policy, and send, via the network interface device, the retrieved policy record and data representative of the users and groups assigned to the retrieved policy record to the requesting client content viewing application, the policy record including data that limits at least one ability of the user to perform at least one action in the requesting client content viewing application with regard to the item of content and at least one other user or group of users assigned to the retrieved policy record.

2. The system of claim 1, wherein the requesting client content viewing application is an application attempting to operate using the content item.

3. The system of claim 1, wherein the database further includes visible user/group records identifying users and groups viewable by users and groups.

4. The system of claim 3, further comprising:
a visible user/group module executable by the at least one processor of the system to:
receive, via the network interface device, a request for a listing of users and groups viewable by the user represented by the user identity data with regard to the content item;
retrieve a listing of users and groups viewable by the user from the database as defined by at least one policy record associated with the user and the content item; and
respond, via the network interface device, to the request by sending data representative of the retrieved listing, wherein the visible user/group module in retrieving only a listing of users and groups viewable by the user thereby limits an ability of the user/group assignment module to receive input modifying user/group policy records that associate a policy record to a user or group record.

5. The system of claim 4, wherein the visible user/group module is further executable by the at least one processor of the system to:
receive the request for and provide the viewable user and group listing with a user interface definition renderable by a computing device from which the request was received;
receive input to modify visible user/group records; and
store the received input to the modified visible user/group records of the database.

6. The system of claim 1, wherein the content item is a page description language document.

7. A method comprising:
receiving, via a network interface device from a requesting client content viewing application, a policy request including user identity data and data identifying a policy assigned to a content item;
determining whether the user represented by the user identity data is associated with the identified policy as either a user or as a member of a defined group, the determining including performing a query against a database storing:
user records representative of system users;
group records defining groups;
group assignment records associating users to groups;
policy records defining content access policies assignable to items of electronic content, wherein a content access policy identifies one or more permitted and restricted user actions with regard to an item of electronic content when a user accesses the item of electronic content associated with the content access policy; and
user/group policy records associating a policy record to a user or group record; and
when the user is associated with the policy, retrieving a policy record as a function of the data identifying the policy, retrieving data representative of users and groups assigned to the retrieved policy record as a function of the data identifying the policy, and sending, via the network interface device, the retrieved policy record and data representative of the users and groups assigned to the retrieved policy record to the requesting client content viewing application, the retrieved policy record including data that limits at least one ability of the user to perform at least one action in the requesting client content viewing application with regard to the item of content and at least one other user or group of users assigned to the retrieved policy record.

8. The method of claim 7, wherein the requesting client content viewing application is an application attempting to operate upon the content item.

9. The method of claim 7, wherein the database further stores data of visible user/group records identifying users and groups viewable by users and groups.

10. The method of claim 9, further comprising:
receiving, via the network interface device, a request for a listing of users and groups viewable by the user represented by the user identity data with regard to the content item;
retrieving, from the database, a listing of users and groups viewable by the user as defined by at least one policy record associated with the user and the content item; and
sending, via the network interface device in response to the request, data representative of the retrieved listing, wherein in retrieving only a listing of users and groups viewable by the user thereby limits an ability of the user/group assignment module to receive input modifying user/group policy records that associate a policy record to a user or group record.

11. The method of claim 10, further comprising:
receiving the request for and providing data of the viewable user and group listing;
receiving input to modify visible user/group records; and
storing the received input to the modified visible user/group records of the database.

12. The method of claim 7, wherein the content item is a page description language document.

13. A computer readable storage medium with instructions stored thereon that are executable by at least one processor of a computer to cause the computer to:
receive, via a network interface device from a requesting client content viewing application, a policy request including user identity data and
data identifying a policy assigned to a content item;
determine whether the user represented by the user identity data is associated with the identified policy as either a user or as a member of a defined group, the determining including performing a query against a database storing:
user records representative of system users;
group records defining groups;
group assignment records associating users to groups;
policy records defining content access policies assignable to items of electronic content, wherein a content access policy identifies one or more permitted and restricted user actions with regard to an item of electronic content when a user accesses the item of electronic content associated with the content access policy; and
user/group policy records associating a policy record to a user or group record; and
when the user is associated with the policy, retrieve a policy record as a function of the data identifying the policy, retrieve data representative of users and groups assigned to the retrieved policy record as a function of the data identifying the policy, and send the policy record and data representative of the users and groups assigned to the retrieved policy record, via the network interface device in response to the received policy request, the retrieved policy record including data that limits at least one ability of the user to perform at least one action with regard to the item of content and at least one other user or group of users assigned to the retrieved policy record.

14. The computer readable storage medium of claim 13, wherein the requesting client content viewing application is an application attempting to operate upon the content item.

15. The computer readable storage medium of claim 13, wherein the database further stores data of visible user/group records identifying users and groups viewable by users and groups.

16. The computer readable storage medium of claim 15, with further instructions stored thereon that are executable by the at least one processor to cause the computer to:

receive, via the network interface device, a request for a listing of users and groups viewable by the user represented by the user identity data with regard to the content item;

retrieve, from the database, a listing of users and groups viewable by the user as defined by at least one policy record associated with the user and the content item; and send, via the network interface device in response to the request, data representative of the retrieved listing, wherein in retrieving only a listing of users and groups viewable by the user thereby limits an ability of the user/group assignment module to receive input modifying user/group policy records that associate a policy record to a user or group record.

17. The computer readable storage medium of claim 13, wherein the content item is a page description language document.

* * * * *